United States Patent Office 3,006,878
Patented Oct. 31, 1961

3,006,878
FLUOROALKYL SILOXANE COMPOSITION
Thomas D. Talcott, Midland, Mich., assignor to Dow Corning Corporation, Midland, Mich., a corporation of Michigan
No Drawing. Filed Apr. 8, 1959, Ser. No. 804,866
11 Claims. (Cl. 260—29.1)

This invention relates to solvent resistant silicone rubber compositions having good shelf life and good handling properties.

Solvent resistant fluorinated silicone rubber has been known since at least 1956 as evidenced by the disclosure in the copending application of Eric D. Brown, Serial No. 594,113, filed June 27, 1956. The silica-filled fluoroalkylpolysiloxane stocks of that application were found to have poor handling properties evidenced by shearing during milling, i.e. adhesion of stock to both rolls of a two roll mill, or calendering and increase of viscosity when subjected to the shear stress of an extruding screw. The milling and calendering problem was reduced by the incorporation in fluoroalkylpolysiloxane stocks of a variety of materials as disclosed in my copending application Serial No. 641,442, filed February 21, 1957. However, the extrudability and aging characteristics of the modified stocks were still poorer than desired. Furthermore, these additive materials caused sufficient dilution of the fluoroalkylpolysiloxanes in their respective stocks to somewhat reduce solvent resistance of the ultimate rubbers. It was therefore desirable to improve the efficiency of these additive materials. I have now discovered an additional additive which works in combination with the improved handling additives to increase their efficiency in providing fluoroalkylpolysiloxane rubber stocks with good handling properties including excellent extrudability, good working time and good shelf life with substantially less loss in solvent resistance than in the additive-free stock.

This invention relates to a vulcanizable composition comprising (1) a polysiloxane gum having a viscosity at 25° C. of at least 100,000 cs. and consisting essentially of units of the formula $RCH_2CH_2Si(CH_3)O$ in which each R is a perfluoroalkyl radical of from one to three carbon atoms, (2) from 1 to 30 parts by weight per 100 parts of polysiloxane (1) of a perfluoroalkylethyl substituted organosilicon compound containing per molecule at least 0.25% by weight silicon-bonded hydroxyl groups, (3) from 0.25 to 10 parts by weight per 100 parts of (1) an organic compound inert to (1) or a benzene-soluble organosilicon compound, said component (3) having a boiling point above 100° C., (4) a vulcanizing agent and (5) from 15 to 100 parts by weight per 100 parts of polysiloxane (1) of a reinforcing silica filler.

The polysiloxane gum (1) is more specifically a polysiloxane consisting essentially of any of such units as $$CF_3CH_2CH_2Si(CH_3)O, C_2F_5CH_2CH_2Si(CH_3)O \text{ and}$$
$$C_3F_7CH_2CH_2Si(CH_3)O$$

The perfluoroalkylethylmethylpolysiloxanes are best prepared by polymerizing the corresponding cyclic trisiloxanes according to the method described in the copending application of Oscar K. Johannson, Serial No. 594,107, filed June 27, 1956, now abandoned. The method of preparation of the cyclic trisiloxanes is described in the copending application of Ogden R. Pierce and George W. Holbrook, Serial No. 594,108, filed June 27, 1956. Both of these copending applications are hereby made a part of this specification by reference.

In general, the polymerization of the cyclic trisiloxane is best carried out in the presence of an alkaline catalyst such as alkali metal hydroxides or the siloxane salts of alkali metal hydroxides at temperatures ranging from 50 to 150° C.

If desired, the polysiloxane gum (1) can be a copolymer of any of the above described fluorinated siloxanes with up to 10 mol percent units of the formula $$Z_mSiO_{\frac{4-m}{2}}$$

in which each Z can be a methyl, ethyl, vinyl or phenyl radical and $m$ has an average value of from 1 to 3. Examples of such $$Z_mSiO_{\frac{4-m}{2}}$$

units include the following units:

$C_2H_5SiO_{1.5}$, $(CH_3)(C_2H_3)SiO$, $(CH_3)_3SiO_{.5}$
$(C_6H_5)(CH_3)SiO$, $C_2H_3SiO_{1.5}$, $CH_3SiO_{1.5}$, $C_6H_5SiO_{1.5}$
$(CH_3)(C_2H_5)SiO$, $(C_6H_5)(C_2H_5)SiO$, $(C_6H_5)(C_2H_3)SiO$
$(C_2H_5)(C_2H_3)SiO$, $(C_6H_5)_2SiO$, $(CH_3)_2SiO$, $(C_2H_3)_2SiO$
$(C_2H_5)_2SiO$, $(CH_3)(C_6H_5)(C_2H_3)SiO_{.5}$
$(CH_3)_2(C_2H_3)SiO_{.5}$, $(C_6H_5)_2(C_2H_5)SiO_{.5}$
$(CH_3)(C_2H_3)_2SiO_{.5}$ and $(C_6H_5)_3SiO_{.5}$ However, the inclusion of such units reduces the solvent resistance of the stock. Some $SiO_2$ units can also be present so long as the average value of $m$ is between 1 and 3.

These copolymers can be prepared by alkaline copolymerization of the respective fluorinated cyclic trimer with a non-fluorinated low molecular weight siloxane made up of the desired extra units. The introduction of small amounts of the methyl, ethyl and phenyl containing siloxanes lowers the brittle point of the resulting rubbers. The use of limited amounts of vinyl containing siloxane units gives elastomers of superior compression set. If, however, the amount of non-fluoroalkylsiloxane is increased above 10 mol percent, inferior swell resistance results.

Whether a homopolymer or copolymer it is necessary that polysiloxane (1) have a viscosity at 25° C. of at least 100,000 cs. in order to ultimately obtain a satisfactory rubber. The polymer can be endblocked with any $Z_3SiO_{.5}$ units, units of the formula $$(RCH_2CH_2)_n(Me)_{3-n}SiO_{.5}$$

in which R is as above defined and $n$ has a value of from 1 to 3 or reactive groups such as hydroxyl or alkoxyl radicals.

The first necessary additive of the additive combination is from 1 to 30 parts, preferably 4 to 12 parts, by weight per 100 parts of polysiloxane (1) of a hydroxylated organosilicon compound (2) in which at least 50% and preferably essentially all of the silicon atoms have attached thereto at least one $RCH_2CH_2$— radical where R is as above defined. In addition, the fluid (2) can contain attached to the silicon atoms R′ groups which can be any monovalent hydrocarbon radical of less than seven carbon atoms, examples of which are as follows: alkyl radicals such as the methyl, ethyl, isopropyl, butyl, tert-butyl, and hexyl radicals; alkenyl radicals such as the vinyl, allyl and hexadienyl radicals; cycloalkyl radicals such as cyclobutyl, cyclopentyl and cyclohexyl radicals; cycloalkenyl radicals such as the cyclopentenyl and cyclohexenyl radicals and the phenyl radical. Some $SiO_2$ units can also be present.

Compound (2) must contain per molecule at least 0.25% by weight silicon-bonded hydroxyl groups. This includes silanols and hydroxy-endblocked siloxanes of no more than about 110 silicon atoms. Compound (2) preferably contains at least about 1% by weight of such groups. While these groups are preferably at the ends of the molecules, there can be hydroxyl groups along the molecular chains. Compounds (2) containing less than 0.25% by weight silicon-bonded hydroxyl groups produce no appreciable beneficial effect when employed in the compositions of this invention.

Compound (2) can be either a silanol or siloxanol or mixtures thereof. The silanols generically include such compounds as, for example,

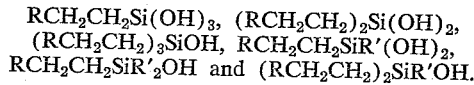

The siloxanols can contain such generic units as, for example,

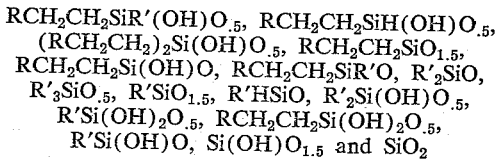

It is preferable that essentially all of the silicon atoms in compound (2) have attached thereto at least one $RCH_2CH_2$— radical.

The preparation of the silanols by hydrolysis of the corresponding halogenosilanes is well-known in the art. The siloxanols are prepared either by condensation of the silanols while stripping off the cyclic products or by the same basic preparation described for the polysiloxane (1) employing the fluorinated cyclic organotrisiloxane and, where desired, some non-fluorinated siloxanes.

The second necessary additive is from .25 to 10 parts, preferably .75 to 3 parts by weight per 100 parts of polysiloxane (1) of a material which has a boiling point above 100° C. at atmospheric pressure and which is selected from the group consisting of organic compounds which are inert to polysiloxane (1) and benzene-soluble organosilicon compounds containing the group $R''_nSi$, where $R''$ is selected from the group consisting of hydrocarbon radicals, hydrocarbonoxy radicals, halogenated hydrocarbonoxy radicals and halogenated hydrocarbon radicals containing less than 3 fluorine atoms, and $n$ has an average value of from 1 to 4 inclusive. The remaining silicon valences are satisfied by hydrogen atoms, oxygen atoms, hydroxyl radicals and other silicon atoms. These materials are fully disclosed in my aforementioned copending application Serial No. 641,442, filed February 21, 1957, the disclosure of which is hereby incorporated herein by reference. Of the various materials disclosed in said copending application the preferred materials are silanes and benzene-soluble siloxanes having an average per silicon atom of at least 1.9 $R'$ groups as defined above. Such materials are well-known in the art. An organopolysiloxane employed as component (3) can be a homopolymer, a copolymer or a mixture of fluids and/or gums. It is preferably a gum having a viscosity at 25° C. of at least 100,000 cs.

A further preferred modification in organosilicon compounds employed as component (3) is that from 0.5 to 50% of the organic radicals be alkenyl radicals such as vinyl, allyl and hexadienyl radicals, preferably vinyl radicals. During vulcanization these radicals will more effectively tie the molecules of component (3) into the rubber so that subsequent exposure of the cured rubber to a solvent will cause less swell than where component (3) is not bound in.

It is necessary that both fluid (2) and organopolysiloxane (3) be present in the compositions of this invention since the use of either additive by itself fails to produce a rubber stock having the desired physical and chemical properties.

The elastomeric compositions of the invention are preferably vulcanized by heating with 0.1 to 10 percent by weight of an organic peroxide such as benzoyl peroxide or bis-2,4-dichlorobenzoyl peroxide, but they can be cured by radiation at room temperature or by incorporating therein the salt of a carboxylic acid such as lead-2-ethylhexoate together with a hydrogen-containing siloxane such as methylhydrogenpolysiloxane and achieving room temperature vulcanization.

The elastomers of this invention contain reinforcing silica fillers, i.e. silica fillers having a surface area of at least 150 square meters per gram. These are most commonly fume silicas, silica aerogels and silica xerogels. Other fillers can also be employed, preferably inorganic materials including, for example, metal oxides such as titania, zinc oxide, ferric oxide and the like and siliceous materials such as clay, diatomaceous earth and crushed quartz. If desired, the fillers particularly the silicas, can be treated with chlorosilanes or in other ways so that the surfaces thereof have organosilyl groups attached to the silicon by SiOSi linkages. For example, the surfaces of the fillers can be modified with trimethylsilyl groups, phenyldimethylsilyl groups, 3,3,3-trifluoropropylmethylsilyl groups and dimethylvinylsilyl groups by the method shown in U.S. Patent 2,863,846.

The reinforcing fillers can be employed in any amount ranging from 15 to 100 parts per 100 parts of polysiloxane (1). In addition non-reinforcing fillers can be incorporated in any amount from 5 to over 200 parts per 100 parts of polysiloxane (1). The precise amount of filler employed in any case will vary with the type of filler and the properties desired in the finished elastomer.

If desired, the compositions of this invention can also contain further additives such as compression set additives, pigments, oxidation inhibitors and other materials commonly employed in organosiloxane rubbers.

The compositions of this invention after vulcanization are particularly useful for the preparation of hoses, seals, linings for fuel tanks and useful for coating electrical insulation which is subjected to fluids, lubricating oils and hydraulic fluids. The unvulcanized compositions have the best handling properties of any known fluoroalkylpolysiloxane based stocks. Furthermore, these compositions form stable dispersions whereas in the absence of the additives the compositions form thixotropic dispersions.

The following examples are illustrative only and should not be construed as limiting the invention which is properly set forth in the appended claims. All amounts are in parts by weight.

*Example 1*

100 parts by weight of a 3,3,3-trifluoropropylmethylpolysiloxane gum having a Williams plasticity between 0.100 and 0.180 inch (equivalent to a viscosity at 25° C. of well over 10,000,000 cs.) were milled together with 30 parts of a fume silica and 15 parts of a silica xerogel. To this mixture was added 7.5 parts by weight of a 3,3,3-trifluoropropylmethylpolysiloxane fluid endblocked with 1.5% by weight silicon-bonded hydroxyl groups, the mixture was heated for three hours at 350° F. and 1.6 parts by weight zinc oxide, 1.6 parts by weight of an organopolysiloxane gum having a Williams plasticity of 0.060 inch and consisting of 96 mol percent dimethylsiloxane units and 4 mol percent methylvinylsiloxane units and 1.0 part of bis-2,4-dichlorobenzoyl peroxide as a 40% by weight dispersion in a 1000 cs. dimethylpolysiloxane fluid were added. This material milled easily without shearing and extruded without giving irregularities in the extruded object.

Samples of the resulting stock were heat cured for varying times from 4 hours at 250° C. to from 4 to 24 hours at from 150° C. to 200° C. All of the cured stocks had excellent swell resistance to hydrocarbon solvents.

*Example 2*

A stock was prepared as in Example 1 employing 100 parts by weight of a 3,3,3-trifluoropropylmethylpolysiloxane gum having a Williams plasticity between 0.100 and 0.180 inch, 40 parts of a fume silica, 11.5 parts of a 3,3,3-trifluoropropylmethylpolysiloxane fluid endblocked with 0.03% by weight silicon-bonded hydroxy groups, 1.6 parts of zinc oxide, 1.6 parts of an organopolysiloxane gum having a Williams plasticity of 0.060 inch and consisting of 96 mol percent dimethylsiloxane units and 4 mol percent methylvinylsiloxane units, 0.1 part of ferric hydroxide as a heat stability additive and 1 part of bis-2,4-dichlorobenzoyl peroxide as a 40% by weight dispersion in 100 cs. dimethylpolysiloxane fluid. This stock milled well without shearing and extruded without giving irregularities in the extruded object.

When this stock is heat cured as in Example 1, a satisfactory solvent resistant rubber results.

*Example 3*

Stocks were prepared as in Example 1 employing 100 parts by weight of a 3,3,3-trifluoropropylmethylpolysiloxane gum having a Williams plasticity between 0.100 and 0.180 inch, 30 parts of a fume silica, 15 parts of a silica xerogel, 0.25 part titanium dioxide, 1.6 parts of an organopolysiloxane gum having a Williams plasticity of 0.060 inch and consisting of 96 mol percent dimethylsiloxane units and 4 mol percent methylvinylsiloxane units, 1 part of bis-2,4-dichlorobenzoyl peroxide as a 40% by weight dispersion in 1000 cs. dimethylpolysiloxane fluid and the following amounts of 3,3,3-trifluoropropylmethylpolysiloxane fluids endblocked with the following amounts of silicon-bonded hydroxyl groups:

| Parts by wt.: | Percent by wt. silicon-bonded OH |
|---|---|
| 5 | 2.07 |
| 7 | 2.07 |
| 9 | 2.07 |
| 6 | 1.5 |
| 8 | 1.5 |
| 10 | 1.5 |

When these stocks were heat cured as in Example 1, satisfactory solvent resistant rubbers resulted.

*Example 4*

When the following copolymers are substituted for the 3,3,3-trifluoropropylmethylpolysiloxane gum having a Williams plasticity of over 0.100 inch in Example 1, stocks having excellent handling properties are obtained which when vulcanized have excellent solvent resistance.

A copolymer having a viscosity of 3,000,000 cs. at 25° C. and consisting of 98 mol percent 3,3,4,4,5,5,5-heptafluoropentylmethylsiloxane units and 2 mol percent dimethylsiloxane units.

A copolymer having a viscosity of 800,000 cs. at 25° C. and consisting of a copolymer of 80 mol percent 3,3,3-trifluoropropylmethylsiloxane units, 15 mol percent 3,3,4,4-pentafluorobutylmethylsiloxane units and 5 mol percent phenylmethylsiloxane units.

A copolymer having a viscosity of 200,000 cs. at 25° C. and consisting of 92 mol percent 3,3,3-trifluoropropylmethylsiloxane units, 6 mol percent phenylmethylsiloxane units, 1 mol percent diphenylsiloxane units, 0.1 mol percent monoethylsiloxane units, 0.1 mol percent trimethylsiloxane units and 0.8 mol percent methylvinylsiloxane units.

*Example 5*

When any of the following combinations of components are mixed as in Example 1, stocks having excellent handling properties are obtained which when vulcanized have satisfactory solvent resistance.

I. 100 parts by weight of 3,3,3-trifluoropropylmethylpolysiloxane having a Williams plasticity of 0.120 inch 1 part by weight of bis-3,3,4,4,5,5,5-heptafluoropentylsilane diol 1 part by weight of 3,3,4,4,4-pentafluorobutyldimethylsilanol 25 parts by weight of a silica aerogel modified with trimethylchlorosilane 8 parts by weight of a copolymer of 60 mol percent dimethylsiloxane units and 40 mol percent methylvinylsiloxane units said copolymer having a viscosity at 25° C. of 1,000,000 cs.

1.5 parts by weight of benzoyl peroxide

II. 100 parts by weight of 3,3,3-trifluoropropylmethylpolysiloxane having a Williams plasticity of 0.120 inch 25 parts by weight of a copolymer of 60 percent 3,3,3-trifluoropropylmethylsiloxane units and 40 mol percent dimethylsiloxane units endblocked with 0.5% by weight silicon-bonded hydroxyl groups 80 parts by weight of a fume silica 3 parts by weight of a methylvinylpolysiloxane having a viscosity at 25° C. of 200,000 cs.

1 part by weight of bis-2,4-dichlorobenzoyl peroxide.

III. 100 parts by weight of 3,3,3-trifluoropropylmethylpolysiloxane having a Williams plasticity of 0.120 inch 5 parts by weight of hydroxy-endblocked symtetrakis - 3,3,3 - trifluoropropyltetramethyltetrasiloxane 30 parts by weight of a fume silica 20 parts by weight of diatomaceous earth 1 part by weight of a phenylmethylvinylsiloxy-endblocked copolymer of 5 mol percent phenylvinylsiloxane units, 10 mol percent dipropylsiloxane units, 5 mol percent cyclohexylmethylsiloxane units, 40 mol percent phenylmethylsiloxane units and 40 mol percent dimethylsiloxane units, said copolymer having a viscosity at 25° C. of 700,000 cs.

1 part by weight of bis-2,4-dichlorobenzoyl peroxide.

*Example 6*

When 1.6 parts by weight of any of the following compounds are substituted for the 0.060 plasticity dimethylsiloxane-methylvinylsiloxane gum in Example 1, the resulting stocks have similar improved handling properties.

N-benzylacetamide, monofluoroacetic acid, p-aminoacetophenone, diphenylacteylene, triethyl aluminum, amyl isocyanide aniline, o-bromoaniline, anthracene, azobenzene, o-chlorobenzaldehyde, 1-bromo-4-iodobenzene, 1,2,3-benzenetriamine, benzidine, o,o'-biphenol, dibutylsulfide, cellulose, cycloheptene-4-ol, cyclohexanone, dibutylamine, pentachlorofluoroethane, decane, bis-β-chloroisopropylether, methyl o-tolyl ether, phenylvinyl ether, diethyl sulfite, glycerol, naphthalene, o-cresol, phenol, 1-phenyl piperazine, piperidine, pyridine, terephthalic acid, propyl ester of thiocyanic acid, hexaethylditin, N,N-dimethyl-o-toluidine, N,N'-dimethylurea, o-chlorotoluene, tetraethylsilane, n-propyl orthosilicate, ethoxytriethylsilane, dibenzylvinylsilanol, sym-tetramethyldivinyldisiloxane, allylcyclopentyldibutoxysilane, phenylmethylpolysilane, $$(\underset{\text{Me}_2}{\text{SiC}}\!\equiv\!\underset{\text{Me}_2}{\text{CSiO}})_x$$

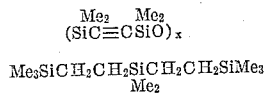

[Pr$_2$SiCH$_2$O]$_2$, triphenylsilane, dibutyl phthalate and hydroxy-endblocked dimethylpolysiloxane containing 3.5% by weight silicon-bonded hydroxyl groups.

That which is claimed is:

1. A vulcanizable composition consisting essentially of (1) a polysiloxane having a viscosity at 25° C. of at least 100,000 cs. and consisting of at least 90 mol percent units of the formula RCH$_2$CH$_2$Si(CH$_3$)O in which R is a perfluoroalkyl radical of from one to three carbon atoms, any remaining siloxane units in (1) having the formula

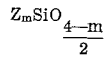

in which each Z is selected from the group consisting of aliphatic hydrocarbon radicals of less than three carbon atoms and the phenyl radical and $m$ has an average value of from 1 to 3 inclusive, (2) from 1 to 30 parts by weight per 100 parts of polysiloxane (1) of an hydroxylated organosilicon compound of not more than 110 silicon atoms having attached to at least 50% of the silicon atoms by a carbon-silicon bond at least one radical of the formula $RCH_2CH_2-$ in which R is as above defined, any other organic radicals attached to said silicon atom being monovalent hydrocarbon radicals of less than seven carbon atoms, said compound (2) containing per molecule at least 0.25% by weight silicon-bonded hydroxyl groups, essentially all the remaining silicon valences being satisfied by oxygen atoms attached to other silicon atoms, (3) from 0.25 to 10 parts by weight per 100 parts of polysiloxane (1) of benzene-soluble organosilicon compounds containing the group $R''_nSi$, where $R''$ is selected from the group consisting of hydrocarbon radicals, hydrocarbonoxy radicals, halogenated hydrocarbonoxy radicals and halogenated hydrocarbon radicals containing less than 3 fluorine atoms, $n$ has an average value of from 1 to 4 inclusive and the remaining silicon valences are satisfied by any of the group consisting of hydrogen atoms, oxygen atoms attached to other silicon atoms, hydroxyl radicals and silicon atoms, (4) a vulcanizing agent and (5) from 15 to 100 parts by weight per 100 parts of polysiloxane (1) of a reinforcing silica filler.

2. The composition of claim 1 in which every Z is an aliphatic hydrocarbon radical of less than three carbon atoms and component (3) is a benzene-soluble organosilicon compound having an average per silicon atom of at least 1.9 monovalent hydrocarbon radicals of less than 7 carbon atoms, any remaining silicon valences being satisfied by oxygen atoms attached to other silicon atoms.

3. The composition of claim 2 in which from 0.5 to 50% of the monovalent hydrocarbon radicals in component (3) are alkenyl radicals.

4. The composition of claim 3 wherein every R is a trifluoromethyl radical and every Z is a methyl radical.

5. The composition of claim 1 wherein polysiloxane (1) consists of units of the formula $RCH_2CH_2Si(CH_3)O$ in which R is as above defined and component (3) is a benzene-soluble organosilicon compound having an average per silicon atom of at least 1.9 monovalent hydrocarbon radicals of less than 7 carbon atoms, any remaining silicon valences being satisfied by oxygen atoms attached to other silicon atoms.

6. The composition of claim 5 in which from 0.5 to 50% of the monovalent hydrocarbon radicals in component (3) are alkenyl radicals.

7. The composition of claim 6 wherein every R is a trifluoromethyl radical.

8. A vulcanizable composition consisting essentially of (1) a 3,3,3-trifluoropropylmethylpolysiloxane having a viscosity at 25° C. of at least 100,000 cs., (2) from 1 to 30 parts by weight per 100 parts of (1) of a 3,3,3-trifluoropropylmethylpolysiloxane having less than 110 silicon atoms per molecule and containing per molecule at least 0.25% by weight silicon-bonded hydroxyl groups, (3) from 0.25 to 10 parts by weight per 100 parts of (1) of an essentially diorganopolysiloxane in which all the organic radicals are monovalent hydrocarbon radicals 0.5 to 50% of which are vinyl radicals, said diorganopolysiloxane having a viscosity at 25° C. of at least 100,000 cs., (4) a vulcanizing agent and (5) from 15 to 100 parts by weight per 100 parts of (1) of a reinforcing silica filler.

9. The composition of claim 1 in which some Z radicals are aliphatic hydrocarbon radicals of less than three carbon atoms and the remainder of the Z radicals are phenyl radicals and component (3) is a benzene-soluble organosilicon compound having an average per silicon atom of at least 1.9 monovalent hydrocarbon radicals of less than 7 carbon atoms, any remaining silicon valences being satisfied by oxygen atoms attached to other silicon atoms.

10. A composition consisting essentially of (1) a polysiloxane having a viscosity at 25° C. of at least 100,000 cs. and consisting of at least 90 mol percent units of the formula $RCH_2CH_2Si(CH_3)O$ in which R is a perfluoroalkyl radical of from one to three carbon atoms, any remaining siloxane units in (1) having the formula

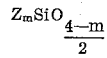

in which each Z is selected from the group consisting of aliphatic hydrocarbon radicals of less than three carbon atoms and the phenyl radical and $m$ has an average value of from 1 to 3 inclusive, (2) from 1 to 30 parts by weight per 100 parts of polysiloxane (1) of an hydroxylated organosilicon compound of not more than 110 silicon atoms having attached to at least 50 percent of the silicon atoms by a carbon-silicon bond at least one radical of the formula $RCH_2CH_2-$ in which R is as above defined, any other organic radicals attached to said silicon atom being monovalent hydrocarbon radicals of less than seven carbon atoms, said compound (2) containing per molecule at least 0.25 percent by weight silicon-bonded hydroxyl groups, essentially all the remaining silicon valences being satisfied by oxygen atoms attached to other silicon atoms, (3) from 0.25 to 10 parts by weight per 100 parts of polysiloxane (1) of a benzene-soluble organosilicon compound containing the group $R''_nSi$, where $R''$ is selected from the group consisting of hydrocarbon radicals, hydrocarbonoxy radicals, halogenated hydrocarbonoxy radicals and halogenated hydrocarbon radicals containing less than 3 fluorine atoms, $n$ has an average value of from 1 to 4 inclusive and the remaining silicon valences are satisfied by any of the group consisting of hydrogen atoms, oxygen atoms attached to other silicon atoms, hydroxyl radicals and silicon atoms, and (4) from 15 to 100 parts by weight per 100 parts of polysiloxane (1) of a reinforcing silica filler.

11. A composition consisting essentially of (1) a 3,3,3-trifluoropropylmethylpolysiloxane having a viscosity at 25° C. of at least 100,000 cs., (2) from 1 to 30 parts by weight per 100 parts of (1) of a 3,3,3-trifluoropropylmethylpolysiloxane having less than 110 silicon atoms per molecule and containing per molecule at least 0.25 percent by weight silicon-bonded hydroxyl groups, (3) from 0.25 to 10 parts by weight per 100 parts of (1) of an essentially diorganopolysiloxane in which all the organic radicals are monovalent hydrocarbon radicals 0.5 to 50 percent of which are vinyl radicals, said diorganopolysiloxane having a viscosity at 25° C. at least 100,000 cs., and (4) from 15 to 100 parts by weight per 100 parts of (1) of a reinforcing silica filler.

References Cited in the file of this patent

Clark: "WADC Technical Report," 54–213, July 1954, Wright Air Development Center, Wright-Patterson Air Force Base, Ohio.

Glime et al.: "Rubber Age," February 1951, pages 564–565.

Kilbourne et al.: "Rubber World," volume 132, 1955, pages 193–200.

Pfeifer et al.: "India Rubber World," volume 129, No. 4, January 1954, pages 481–484 and 488.

UNITED STATES PATENT OFFICE
CERTIFICATE OF CORRECTION

Patent No. 3,006,878

October 31, 1961

Thomas D. Talcott

It is hereby certified that error appears in the above numbered patent requiring correction and that the said Letters Patent should read as corrected below.

Column 5, line 2, for "0.03%" read -- 0.93% --; line 9, for "100 cs." read -- 1000 cs. --; same column 5, line 54, for "3,3,4,4-" read -- 3,3,4,4,4- --; column 6, line 11, after "60" insert -- mol --.

Signed and sealed this 10th day of April 1962.

(SEAL)
Attest:

ERNEST W. SWIDER
Attesting Officer

DAVID L. LADD
Commissioner of Patents